United States Patent
Laudon et al.

(10) Patent No.: US 7,454,631 B1
(45) Date of Patent: Nov. 18, 2008

(54) METHOD AND APPARATUS FOR CONTROLLING POWER CONSUMPTION IN MULTIPROCESSOR CHIP

(75) Inventors: James P. Laudon, Madison, WI (US); Curtis R. McAllister, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 339 days.

(21) Appl. No.: 11/078,570

(22) Filed: Mar. 11, 2005

(51) Int. Cl.
G06F 1/00 (2006.01)
G06F 1/26 (2006.01)
G06F 9/46 (2006.01)

(52) U.S. Cl. .................. 713/300; 713/320; 718/100; 718/102

(58) Field of Classification Search .......... 713/300, 713/320, 323, 324; 718/100, 102
See application file for complete search history.

(56) References Cited

U.S. PATENT DOCUMENTS

| | | | | |
|---|---|---|---|---|
| 5,590,061 A | * | 12/1996 | Hollowell et al. | 702/130 |
| 5,630,110 A | * | 5/1997 | Mote, Jr. | 713/501 |
| 5,710,911 A | * | 1/1998 | Walsh et al. | 713/500 |
| 6,014,611 A | * | 1/2000 | Arai et al. | 702/132 |
| 6,442,700 B1 | * | 8/2002 | Cooper | 713/320 |
| 6,651,176 B1 | * | 11/2003 | Soltis et al. | 713/300 |
| 6,792,550 B2 | * | 9/2004 | Osecky et al. | 713/300 |
| 6,804,632 B2 | * | 10/2004 | Orenstien et al. | 702/188 |
| 6,908,227 B2 | * | 6/2005 | Rusu et al. | 374/141 |
| 7,051,221 B2 | * | 5/2006 | Clabes et al. | 713/320 |
| 7,069,189 B2 | * | 6/2006 | Rotem | 702/189 |
| 7,120,808 B2 | * | 10/2006 | Miyairi et al. | 713/322 |
| 2004/0054937 A1 | * | 3/2004 | Williams et al. | 713/300 |
| 2004/0128663 A1 | * | 7/2004 | Rotem | 717/161 |
| 2005/0125701 A1 | * | 6/2005 | Hensbergen et al. | 713/320 |
| 2005/0216222 A1 | * | 9/2005 | Inoue | 702/136 |
| 2005/0289365 A1 | * | 12/2005 | Bhandarkar | 713/300 |
| 2006/0004988 A1 | * | 1/2006 | Jordan | 712/43 |
| 2006/0136915 A1 | * | 6/2006 | Aingaran et al. | 718/100 |
| 2006/0136919 A1 | * | 6/2006 | Aingaran et al. | 718/100 |
| 2006/0253715 A1 | * | 11/2006 | Ghiasi et al. | 713/300 |

OTHER PUBLICATIONS

Tanenbaum Andrew S., Structured Computer Organization, 1984, Prentice-Hall Inc., 2nd Ed., pp. 10-12.*

* cited by examiner

*Primary Examiner*—Mark Connolly
(74) *Attorney, Agent, or Firm*—Martine Penilla & Gencarella, LLP

(57) ABSTRACT

A system is provided for detecting when a temperature of a multiprocessor chip approaches an established threshold temperature indicating an imminent overheat condition. When the threshold temperature is reached, a number of active threads are idled in order to remove their contribution from the overall power consumption of the multiprocessor chip. Idling of the threads serves to prevent the multiprocessor chip from reaching the overheat condition. Once the temperature of the multiprocessor chip drops to an acceptable level, execution of the previously idled threads is resumed. Detection of the imminent overheat condition and corresponding idling of the threads to avoid reaching the overheat condition is conducted by hardware to ensure timely reduction of the multiprocessor chip temperature.

17 Claims, 5 Drawing Sheets

US 7,454,631 B1

METHOD AND APPARATUS FOR CONTROLLING POWER CONSUMPTION IN MULTIPROCESSOR CHIP

BACKGROUND

Semiconductor process technology has advanced to the point where multiple processors can be placed on a single chip to produce a multiprocessor chip. Peak power consumption of the multiple processors on the multiprocessor chip can reach high levels, thus generating high temperatures. In some cases, the high temperatures corresponding to peak power consumption can cause thermal damage to the multiprocessor chip. To ensure that the multiprocessor chip does not suffer thermal damage, the multiprocessor chip must be designed to withstand temperatures associated with the worst case peak power consumption. However, designing the multiprocessor chip to accommodate the peak power consumption of its multiple processors can increase chip cost and/or decrease chip performance. In view of the foregoing, a system is needed to prevent the multiprocessor chip from suffering thermal damage associated with excessive temperatures during a peak power consumption event.

SUMMARY

It should be appreciated that the present invention can be implemented in numerous ways, such as a process, an apparatus, a system, a device or a method. Several inventive embodiments of the present invention are described below.

In one embodiment, a method for controlling power consumption in a multiprocessor chip is disclosed. The method includes an operation for identifying an imminent overheat condition within the multiprocessor chip. The method also includes an operation for idling a number of active threads in the multiprocessor chip in response to identifying the imminent overheat condition. Idling of the number of threads causes a power consumption associated with each idled thread to be reduced.

In another embodiment, an apparatus for controlling power consumption in a multiprocessor chip is disclosed. The apparatus includes a thermal event bit and a number of thermal control bits. The thermal event bit signals an imminent overheat condition within the multiprocessor chip. Each of the number of thermal control bits is associated with a different thread of the multiprocessor chip. A state of each thermal control bit indicates an idling instruction for the thread associated with the thermal control bit. The idling instruction indicates whether or not the thread is to be idled when the imminent overheat condition is signaled by the thermal event bit. Additionally, the apparatus includes thread control logic defined to idle a number of threads of the multiprocessor chip when the thermal event bit signals the imminent overheat condition. The thread control logic is defined to idle the number of threads in accordance with the idling instructions provided by the thermal control bits.

In another embodiment, a system for controlling power consumption in a multiprocessor chip is disclosed. The system includes thermal management logic defined to monitor a temperature of the multiprocessor chip and identify an imminent overheat condition within the multiprocessor chip. A mask register is also provided within the system, wherein the mask register includes a number of bits corresponding to each thread of the multiprocessor chip. Each bit of the mask register is set to indicate an idling instruction for its corresponding thread. The idling instruction indicates whether or not the thread is to be idled when an imminent overheat condition is identified. The system further includes thread control logic defined to respond to an identification of the imminent overheat condition by idling the threads of the multiprocessor chip in accordance with the idling instructions as indicated by the mask register.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
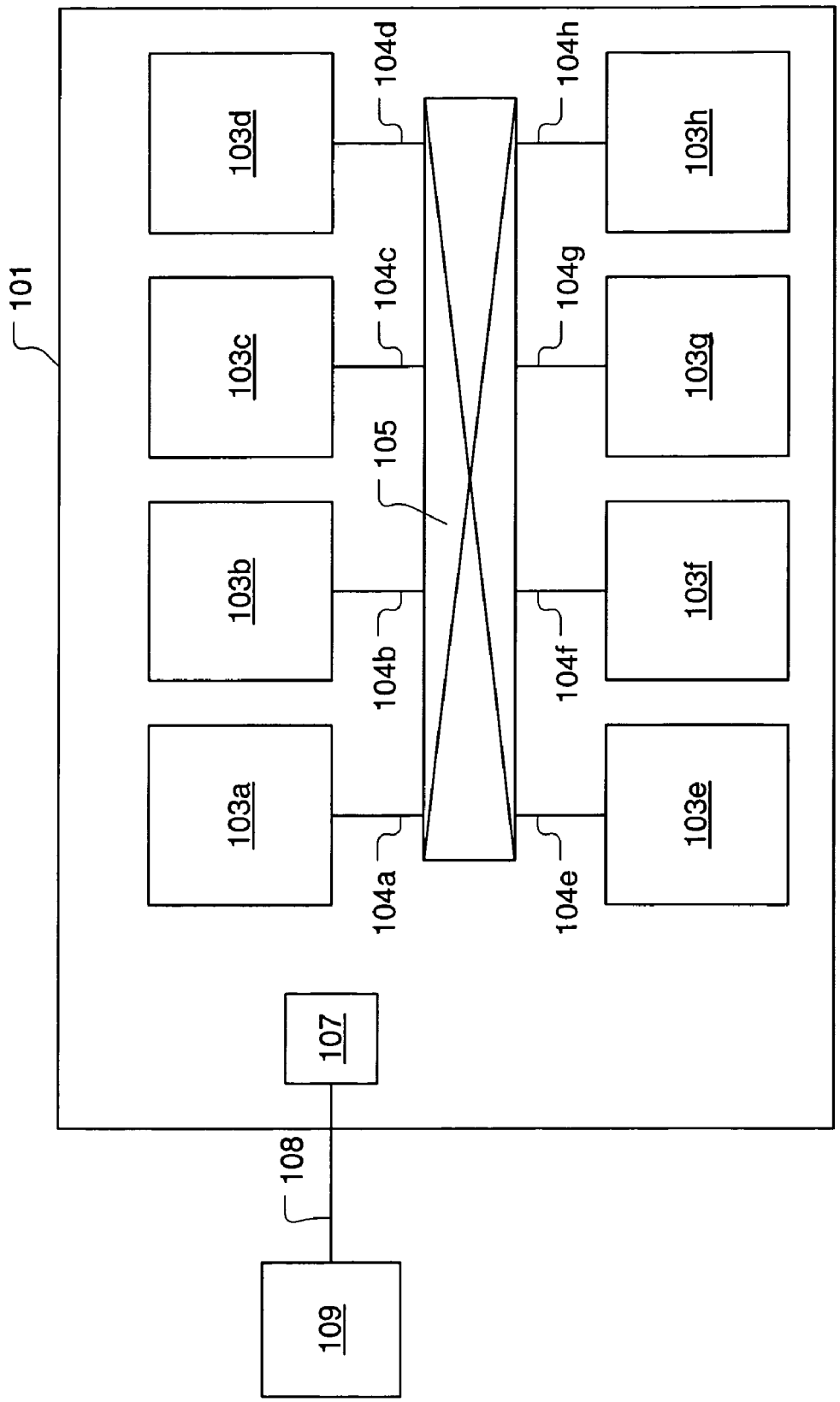
FIG. 1 is an illustration showing a multiprocessor chip, in accordance with one embodiment of the present invention.

FIG. 1 is an illustration showing a multiprocessor chip 101, in accordance with one embodiment of the present invention. The multiprocessor chip 101 includes eight processor cores 103a-103h. Each of the processor cores 103a-103h is connected to a crossbar bus 105, as indicated by connections 104a-104h, respectively. The crossbar bus 105 enables each processor core 103a-103h to communicate with any other processor core 103a-103h. Though the present invention is described herein in the context of the multiprocessor chip 101, it should be understood that the present invention can be implemented in any multiprocessor chip having any number of processor cores being interconnected in any manner. The multiprocessor chip 101 further includes a temperature sensor 107 in communication with a thermal management controller 109, as indicated by connection 108. In one embodiment, the temperature sensor 107 is defined as a thermal diode within the multiprocessor chip 101. In the embodiment of FIG. 1, the thermal management controller 109 is defined external to the multiprocessor chip 101. However, in other embodiments, the thermal management controller 109 can be defined within the multiprocessor chip 101.

During operation of the multiprocessor chip 101 each of the processor cores 103a-103h is capable of operating one or more independent threads in a simultaneous manner. For example, in one embodiment each of the processor cores 103a-103h is capable of operating up to four independent threads, thus allowing the multiprocessor chip 101 to have up to thirty-two independent threads operating at a given time. Also during operation of the multiprocessor chip 101, the thermal management controller 109 operates to monitor a temperature of the multiprocessor chip 101 as measured using the temperature sensor 107. It should be appreciated that the temperature sensor 107 can be disposed within or external to the multiprocessor chip 101. Additionally, rather than using a single temperature sensor 107, an array of temperature sensors may be dispersed throughout the multiprocessor chip 101 to provide more location-specific temperature readings. For example, in one embodiment a temperature sensor can be disposed within each processor core 103a-103h to provide a processor core-specific temperature reading.

It should be appreciated that having a large number of threads executing in a simultaneous manner can lead to an overheat condition in which thermal damage can be inflicted upon the multiprocessor chip 101. Thus, to avoid the overheat condition, it is necessary to implement a system for controlling the power consumption of the multiprocessor chip 101. The present invention provides a system that enables dynamic control of power consumption in the multithreaded multiprocessor chip 101. More specifically, the system of the present invention detects when the temperature of the multiprocessor chip 101 approaches an established threshold temperature indicating an imminent overheat condition. When the threshold temperature is reached, the system of the present invention idles a number of active threads in order to reduce their contribution to the overall power consumption of the multiprocessor chip 101. Idling of the threads serves to prevent the multiprocessor chip 101 from reaching the overheat condition. Once the temperature of the multiprocessor chip 101 drops to an acceptable level, the system of the present invention will resume the previously idled threads. It should be appreciated that the detection of the imminent overheat condition and the responsive idling of threads in the present invention is performed by hardware to ensure that power consumption is reduced in a timely manner to avoid the overheat condition.

Figure 2A:
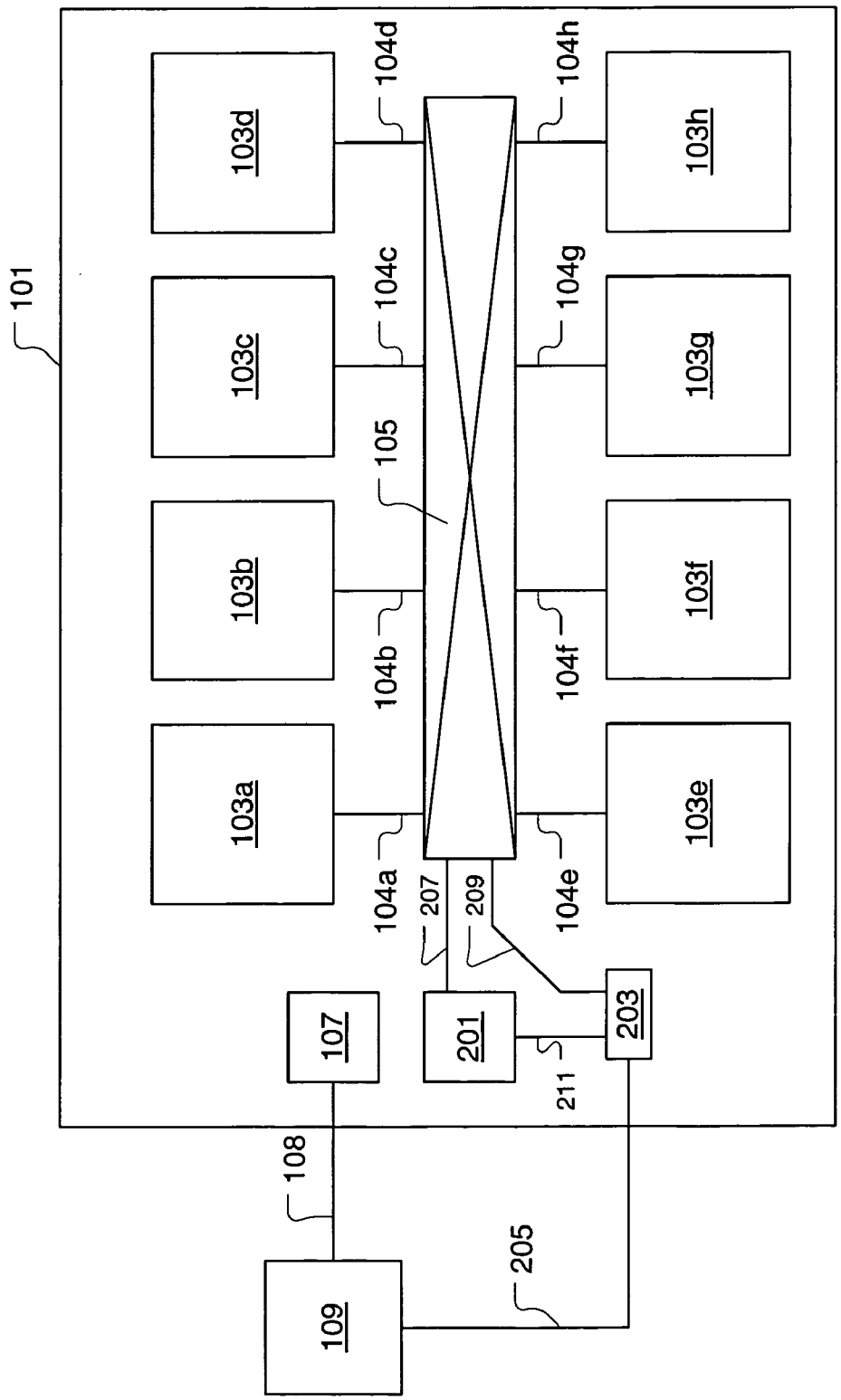
FIG. 2A is an illustration showing the multiprocessor chip having a system implemented therein for dynamic control of power consumption, in accordance with one embodiment of the present invention.

FIG. 2A is an illustration showing the multiprocessor chip 101 having a system implemented therein for dynamic control of power consumption, in accordance with one embodiment of the present invention. As previously discussed with respect to FIG. 1, the multiprocessor chip 101 is shown to include processor cores 103a-103h in connection to the crossbar bus 105. Additionally, the temperature sensor 107 is shown to be disposed within the multiprocessor chip 101 and connected to a thermal management controller 109. Although the present embodiment depicts the thermal management controller 109 as being defined external to the multiprocessor chip 101, it should be appreciated that other embodiments can have the thermal management controller 109 defined onboard the multiprocessor chip 101. The multiprocessor chip 101 is also shown to include thread control logic 201 connected to the crossbar bus 105, as indicated by a connection 207. The thread control logic 201 is further connected to a mask register 203, as indicated by a connection 211. The mask register 203 is connected to both the thermal management controller 109 and the crossbar bus 105, as indicated by connections 205 and 209, respectively.

As previously discussed with respect to FIG. 1, any number of temperature sensors can be disposed within or external to the multiprocessor chip 101. For ease of discussion, the single temperature sensor 107 will be used to represent the variety of diverse temperature sensor placement configurations that may be implemented in actual practice. During operation, the temperature sensor 107 is used to measure a temperature of the multiprocessor chip 101. In the embodiment wherein the temperature sensor 107 is a thermal diode, a terminal voltage of the thermal diode is transmitted to the thermal management controller 109 via the connection 108. The terminal voltage is translated into a corresponding temperature based on a calibration curve for the particular thermal diode.

The thermal management controller 109 functions to monitor the temperature of the multiprocessor chip 101 as indicated by the temperature sensor 107. The thermal management controller 109 is defined to continuously compare the monitored temperature of the multiprocessor chip 101 to a pre-established threshold temperature corresponding to an imminent overheat condition of the multiprocessor chip 101. In the event that the monitored temperature of the multiprocessor chip 101 reaches the threshold temperature, the thermal management controller 109 is defined to set a thermal event bit within the mask register 203 via the connection 205. More specifically, the thermal event bit is set by the thermal management controller 109 to provide an indication that the overheat condition is imminent. Any logic concerned with the thermal condition of the multiprocessor chip 101, e.g., the thread control logic 201, can monitor the thermal event bit to determine when the imminent overheat condition is reached. Monitoring of the multiprocessor chip 101 temperature and setting of the thermal event bit by the thermal management controller 109 are each hardware implemented operations. Thus, the thermal event bit is set in essentially an instantaneous manner upon detecting the imminent overheat condition. Conversely, resetting of the thermal event bit upon the imminent overheat condition subsiding can be performed using software, because timing is not as crucial for resuming idled threads as it is for idling threads to reduce power consumption, i.e., reduce temperature.

Figure 2B:
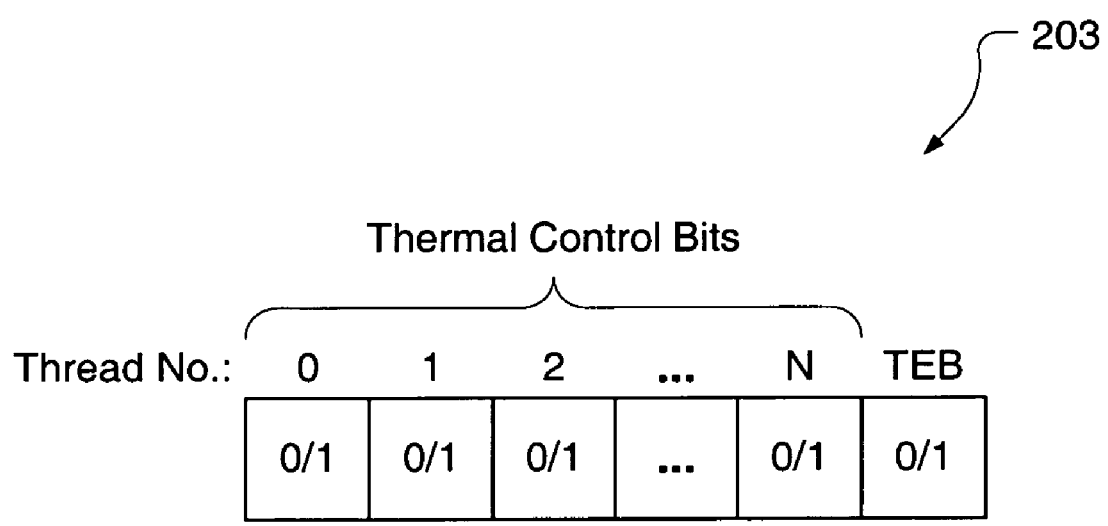
FIG. 2B is an illustration showing a configuration of the mask register, in accordance with one embodiment of the present invention.

Prior to discussing the operations that occur upon setting of the thermal event bit in response to the imminent overheat condition, it is informative to discuss the mask register 203. FIG. 2B is an illustration showing a configuration of the mask register 203, in accordance with one embodiment of the present invention. The mask register 203 is defined as a bit vector, wherein each possible thread of the multiprocessor chip 101 is assigned a unique bit and at least one additional bit is designated as the thermal event bit. With respect to FIG. 2B the bits assigned to each possible thread, i.e., threads 0 through N, are referred to as thermal control bits. The bit designated as the thermal event bit is identified as TEB. Each bit of the mask register 203 is capable of storing a low or high state as indicated by 0 and 1, respectively. Each of the thermal control bits is set to indicate whether its corresponding thread is to be idled in the event that the imminent overheat condition occurs, i.e., in the event that the thermal event bit is set. It should be appreciated that either a low state or a high state can be used to indicate that a thread is to be idled. For ease of discussion, it will be assumed hereafter that a high state represents a setting of the thermal control bits to indicate that a corresponding thread is to be idled and resumed, and a low state of the thermal control bits indicates that a corresponding thread is not to be idled and resumed. Additionally, for ease of discussion, it will be assumed hereafter that a high state of the thermal event bit indicates that the imminent overheat condition has been detected, and a low state of the thermal event bit indicates that the temperature of the multiprocessor chip 101 is within an acceptable operating range.

Furthermore, although the present invention is discussed primarily in terms of having control of all threads be partially-dependent upon a single thermal event bit, it should be understood that other embodiments can divide control of the threads among a number of thermal event bits. For example, threads operating within a particular region of the multiprocessor chip 101 can be associated with a particular thermal event bit that is set according to temperature readings obtained from a temperature sensor within the particular region of the multiprocessor chip 101.

In accordance with the foregoing, each thermal control bit of the mask register 203 is associated with a different thread of the multiprocessor chip 101. A state of each thermal control bit indicates an idling instruction for the thread associated with the thermal control bit. The idling instruction indicates whether or not the thread is to be idled when the imminent overheat condition is signaled by the thermal event bit. Additionally, the idling instruction provided by each thermal control bit serves to indicate which threads are to be resumed once the imminent overheat condition has subsided. For example, if a thread has its thermal control bit set to high when the thermal event bit goes high, the thread will be idled. Then, when the thermal event bit goes low, the high state of the thermal control bit will indicate that execution of the thread is to be resumed.

It should be appreciated that the operation of "idling" a thread in the present invention can be performed in a number of ways. In one embodiment, when a thread is "idled" in response to the imminent overheat condition, the thread is essentially turned off until the thermal control bit indicates that execution of the thread is to be resumed. In another embodiment, when a thread is "idled" in response to the imminent overheat condition, the thread is placed in a pulse width modulation mode until the thermal control bit indicates that execution of the thread is to be resumed. In the pulse width modulation mode, the "idled" thread is turned off and on in a cyclical manner. For example, the thread is turned off for about 2 microseconds to about 4 microseconds, then the thread is turned back on for about 2 microseconds, then the cycle repeats with the thread being turned off again for the specified duration of time. It should be understood that the specific time durations identified above for turning the thread off and on in the pulse width modulation mode are provided as examples. The pulse width modulation mode can be implemented using essentially any time durations for turning the thread off and on so long as the objective of avoiding the overheat condition is met. Use of the pulse width modulation mode can allow the "idled" thread to make some forward progress while still reducing power consumption a sufficient amount to avoid the overheat condition. With respect to thread operation as discussed hereafter, the term "idle" is intended to refer to any embodiment in which operation of the thread is reduced from a normal level in the interest of controlling power consumption of the multiprocessor chip 101 to avoid an overheat condition. In one embodiment, the term "idle" refers to simply turning the thread off. In another embodiment, the term "idle" refers to operating the thread in the pulse width modulation mode.

The state of each thermal control bit in the mask register 203 is set through software via the connection 209. It should be appreciated that use of software to set the thermal control bits provides flexibility in defining a thermal management policy for the multiprocessor chip 101. For example, in one embodiment, determining which threads are to be idled when the imminent overheat condition occurs can be performed based on software implemented calculations of a power envelope relative to worst case power consumption criteria. In other embodiments, determining which threads are to be idled when the imminent overheat condition occurs can be performed in a rotational manner among the threads or in accordance with priorities assigned to particular threads, e.g., quality of service agreements.

The thread control logic 201 is defined to monitor the thermal event bit in the mask register 203 for indication of the imminent overheat condition. When the thermal event bit is set to indicate occurrence of the imminent overheat condition, the thread control logic 201 functions to idle threads within the multiprocessor chip 101 according to the thermal control bit setting for each thread. The idling of a thread prevents the thread from issuing any further instructions, thus causing a power consumption of the thread to drop to a significantly smaller level. The connection 211 represents the thread control logic 201 access to the mask register 203 for monitoring the thermal event bit and reading the thermal control bits. The connection 207 represents the thread control logic 201 access to the multiprocessor chip 101 for idling and subsequently resuming threads executing therein. Because detection of the imminent overheat condition and corresponding thread idling response is time sensitive, the thread control logic 201 is defined as a hardware statemachine.

Figure 3:
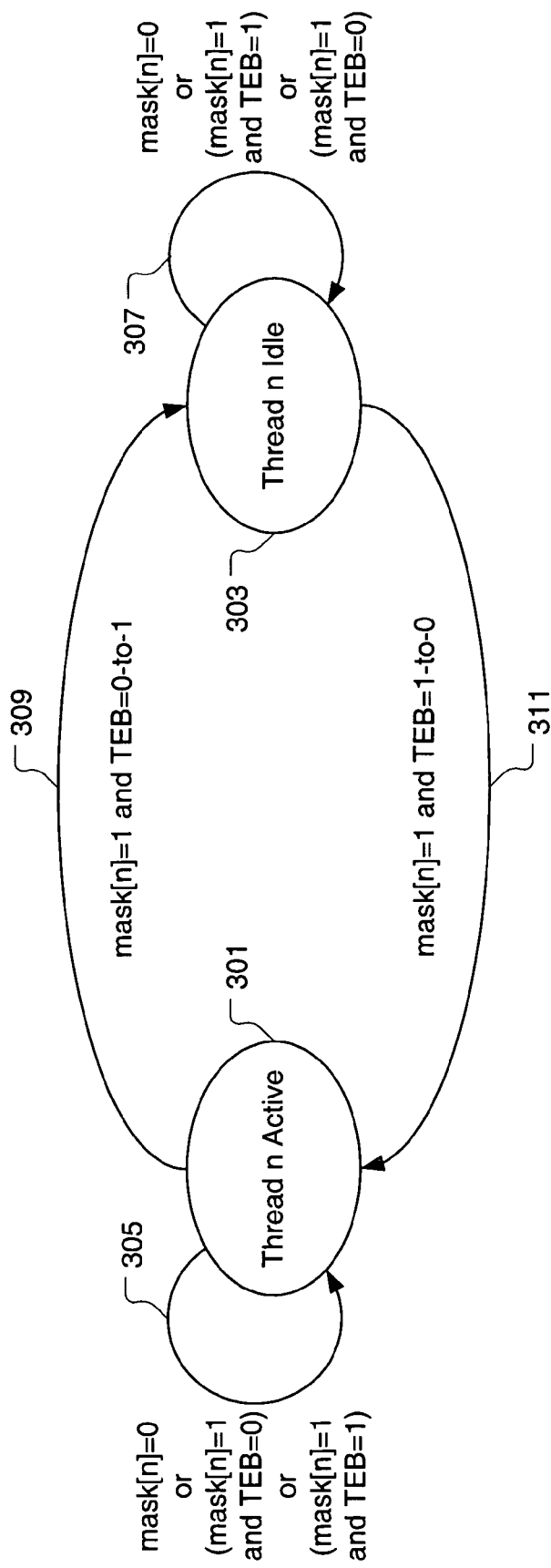
FIG. 3 is an illustration showing a statemachine diagram for a portion of the thread control logic, in accordance with one embodiment of the present invention.

FIG. 3 is an illustration showing a statemachine diagram for a portion of the thread control logic 201, in accordance with one embodiment of the present invention. The statemachine diagram of FIG. 3 corresponds to an arbitrary thread "n." The thread control logic 201 includes a number of the FIG. 3 statemachines operating in a parallel manner, wherein each statemachine corresponds to a particular thread within the multiprocessor chip 101. For discussion purposes, a state 301 is considered as an initial state in which the thread "n" is active. A transition 305 represents continuing execution of the thread "n." The transition 305 occurs either when the thermal control bit for thread "n" is low (mask[n]=0), or when both the thermal event bit is low (TEB=0) and the thermal control bit for thread "n" is high (mask[n]=1), or when both the thermal event bit is high (TEB=1) and the thermal control bit for thread "n" is high (mask[n]=1). If the thermal event bit transitions from low to high (TEB=0-to-1) while the thermal control bit for thread "n" is high (mask[n]=1), a transition 309 occurs in which the statemachine transitions from the state 301 to a state 303. During the transition 309, the thread control logic 201 functions to idle the thread "n." Thus, in the state 303, the thread "n" is idled.

From the state 303, a transition 307 represents continued idling of the thread "n." The transition 307 occurs either when the thermal control bit for thread "n" is low (mask[n]=0), or when both the thermal event bit is high (TEB=1) and the thermal control bit for thread "n" is high (mask[n]=1), or when both the thermal event bit is low (TEB=0) and the thermal control bit for thread "n" is high (mask[n]=1). It should be appreciated that if the state 303 had been considered as the initial state, the condition for transition 307 in which the thermal control bit for thread "n" is low (mask[n]=0) would have caused the thread "n" to remain idle regardless of any change to the thermal event bit. Thus, if the thermal control bit for thread "n" is set to low (mask[n]=0), the thread "n" is not affected by the system for limiting power consumption in the multiprocessor chip 101. While in the state 303, if the thermal event bit transitions from high to low (TEB=1-to-0) while the thermal control bit for thread "n" is high (mask[n]=1), a transition 311 occurs in which the statemachine transitions from the state 303 back to the state 301. During the transition 311, the thread control logic 201 functions to resume execution of the thread "n." Therefore, once the imminent overheat condition has subsided, the thread control logic causes all threads that were previously idled according to the mask register 203 settings to resume execution. As previously mentioned, in one embodiment, resumption of thread execution can be placed under software control to allow more flexibility in considering power envelope constraints relative to idled threads that need to resume execution. In this embodiment, the transition 311 would trigger the appropriate software to begin resumption of thread execution.

It should be appreciated that the system of present invention for dynamic control of power consumption in the multiprocessor chip 101 allows for execution of all threads during normal power operation, and idles threads only when the imminent overheat condition is detected. Additionally, the present invention allows the multiprocessor chip 101 to be safely and economically designed for an average power consumption level rather than a peak power consumption level.

Figure 4:
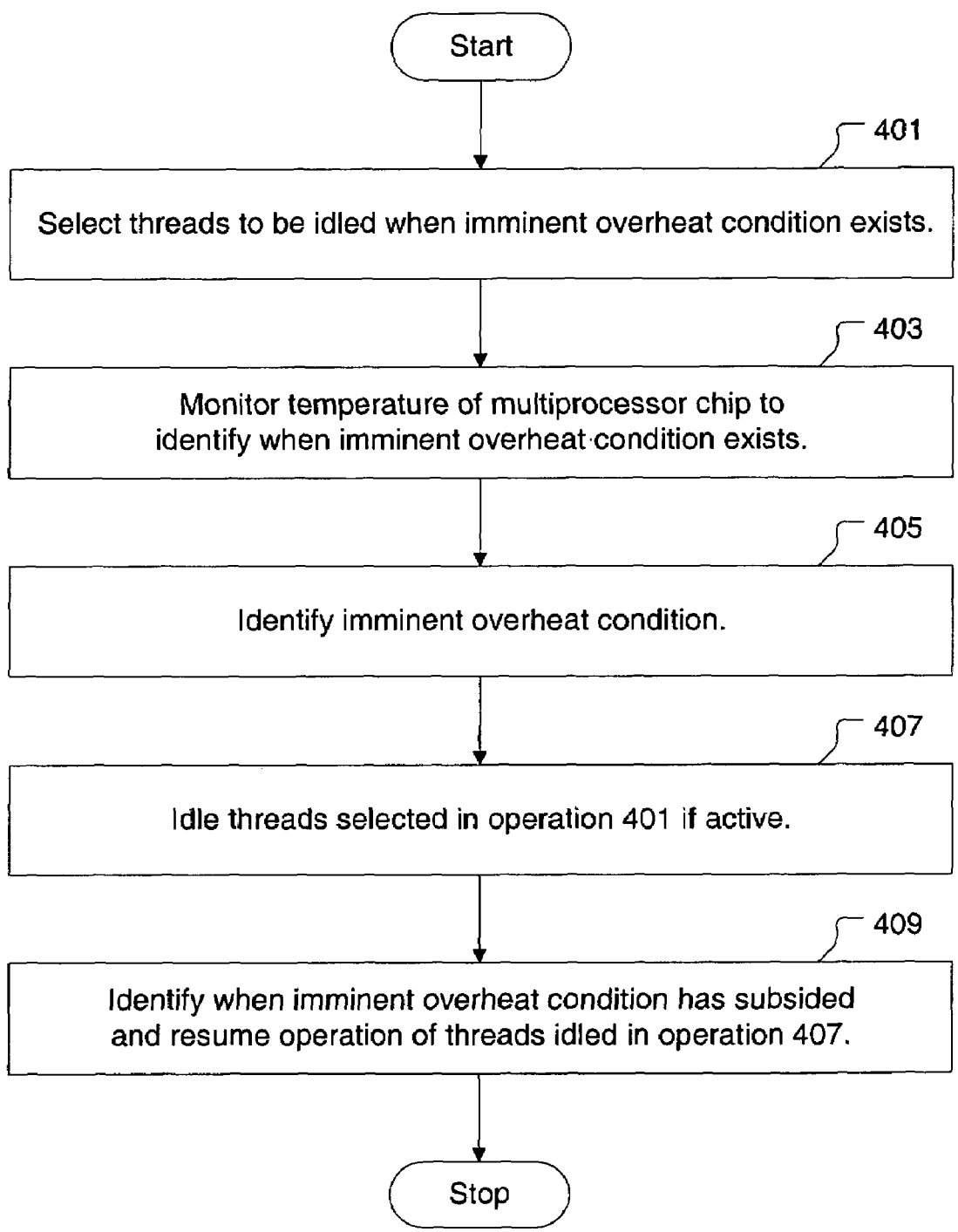
FIG. 4 is an illustration showing a flowchart of a method for controlling power consumption in a multiprocessor chip, in accordance with one embodiment of the present invention.

FIG. 4 is an illustration showing a flowchart of a method for controlling power consumption in a multiprocessor chip, in accordance with one embodiment of the present invention. In an operation 401, a number of threads are selected to be idled in the event that an imminent overheat condition occurs within the multiprocessor chip. In one embodiment, an identity of each thread selected in the operation 401 is stored in a register for future reference. In an operation 403, a temperature of the multiprocessor chip is monitored and compared to a threshold temperature at which the imminent overheat condition exists. Then, in an operation 405, the imminent overheat condition is identified. In one embodiment, a thermal event bit is set to signal identification of the imminent overheat condition.

In response to identifying the imminent overheat condition in the operation 405, the method proceeds with an operation 407 in which a number of active threads in the multiprocessor chip are idled. The threads idled in the operation 407 are the threads selected in the operation 401. Idling of the threads in the operation 407 causes a power consumption associated with each idled thread to be reduced to an insignificant level, thus reducing an overall temperature of the multiprocessor chip. In one embodiment, idling of the active threads in the operation 407 is performed in response to the setting of the thermal event bit to signal identification of the imminent overheat condition. Additionally, idling of the active threads in the operation 407 is performed without software intervention. The method further includes an operation 409 for identifying when the imminent overheat condition has subsided and resuming operation of the threads idled in the operation 407. In one embodiment, the thermal event bit is cleared to signal when the imminent overheat condition has subsided. Also, in one embodiment, resuming operation of the threads in the operation 409 is directed by software.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling power consumption in a multiprocessor chip, comprising:
    respectively assigning a thermal control bit to each possible thread of the multiprocessor chip, such that each possible thread has a unique thermal control bit;
    setting a state of each thermal control bit to indicate whether or not the thread to which the thermal control bit is assigned is to be idled upon identification of an imminent overheat condition within the multiprocessor chip, wherein the state of each thermal control bit is set according to a thermal management policy based on priorities respectively assigned to each possible thread of the multiprocessor chip;
    identifying an imminent overheat condition within the multiprocessor chip; and
    idling each active thread in the multiprocessor chip according to its thermal control bit setting in response to identifying the imminent overheat condition, wherein idling of a given active thread in the multiprocessor chip prevents the given active thread from issuing any further instructions until operation of the given idled active thread resumes, wherein idling each active thread in the multiprocessor chip according to its thermal control bit setting in response to identifying the imminent overheat condition is performed without software intervention.

2. The method of claim 1, wherein identifying the imminent overheat condition is performed by monitoring a temperature of the multiprocessor chip and comparing the temperature of the multiprocessor chip to a threshold temperature at which the imminent overheat condition exists.

3. The method of claim 1, further comprising:
    setting a thermal event bit to signal identification of the imminent overheat condition, the idling of the number of active threads being performed in response to the setting of the thermal event bit.

4. The method of claim 1, wherein the state of each thermal control bit is set prior to identifying the imminent overheat condition so as to select selecting the threads to be idled prior to identifying the imminent overheat condition.

5. The method of claim 1, further comprising:
identifying when the imminent overheat condition has subsided; and
resuming operation of the number of idled threads in response to identifying when the imminent overheat condition has subsided.

6. The method of claim 5, wherein idling the number of threads corresponds to operating each of the number of threads in a pulse width modulation mode.

7. An apparatus for controlling power consumption in a multiprocessor chip, comprising:
a thermal event bit for signaling an imminent overheat condition within the multiprocessor chip;
a number of thermal control bits, wherein each thermal control bit is associated with a different thread of the multiprocessor chip, a state of each thermal control bit indicating an idling instruction for the thread associated with the thermal control bit, wherein the idling instruction indicates whether or not the thread is to be idled when the imminent overheat condition is signaled by the thermal event bit; and
thread control logic defined to idle a number of threads of the multiprocessor chip when the thermal event bit signals the imminent overheat condition, wherein the thread control logic is defined to idle the number of threads in accordance with the idling instructions provided by the thermal control bits, wherein idling of a given thread in the multiprocessor chip prevents the given thread from issuing any further instructions until operation of the given idled thread resumes, wherein the thread control logic is configured to idle the threads without software intervention.

8. The apparatus of claim 7, wherein the thermal event bit and the number of thermal control bits are included in a register defined within a memory of the multiprocessor chip.

9. The apparatus of claim 7, wherein each thermal control bit is configured to have its state set by software.

10. The apparatus of claim 7, further comprising:
thermal management logic defined to monitor a temperature of the multiprocessor chip and identify the imminent overheat condition within the multiprocessor chip, the thermal management logic being defined to set a state of the thermal event bit to signal identification of the imminent overheat condition.

11. The apparatus of claim 10, wherein the thermal management logic is defined to identify when the imminent overheat condition has subsided and set a state of the thermal event bit to signal that there is not an imminent overheat condition.

12. The apparatus of claim 11, wherein the thread control logic is defined to resume operation of the number of idled threads in response to the thermal event bit signaling that there is not an imminent overheat condition.

13. A system for controlling power consumption in a multiprocessor chip, comprising:
thermal management logic defined to monitor a temperature of the multiprocessor chip and identify an imminent overheat condition within the multiprocessor chip;
a mask register including a number of bits corresponding to each thread of the multiprocessor chip, each bit of the mask register being set to indicate an idling instruction for its corresponding thread, wherein the idling instruction indicates whether or not the thread is to be idled when an imminent overheat condition is identified; and
thread control logic defined to respond to an identification of the imminent overheat condition by idling the threads of the multiprocessor chip in accordance with the idling instructions as indicated by the mask register, wherein idling of a given thread in the multiprocessor chip prevents the given thread from issuing any further instructions until operation of the given idled thread resumes, wherein the thread control logic is defined to respond to the identification of the imminent overheat condition by idling the threads without software intervention.

14. The system of claim 13, wherein the idling instruction provided by each bit of the mask register is capable of being set through software.

15. The system of claim 13, wherein the thermal management logic is defined to identify when the imminent overheat condition has subsided and provide a signal to the thread control logic indicating that the overheat condition has subsided.

16. The system of claim 15, wherein the thread control logic is defined to resume operation of the number of idled threads in response to the signal indicating that the overheat condition has subsided.

17. The system of claim 16, wherein the thread control logic is defined to resume operation of the number of idled threads in accordance with directions provided by software.

* * * * *